M. Ernsberger,
Saw-Gummer,
Nº 19,835. Patented Apr. 6, 1858.
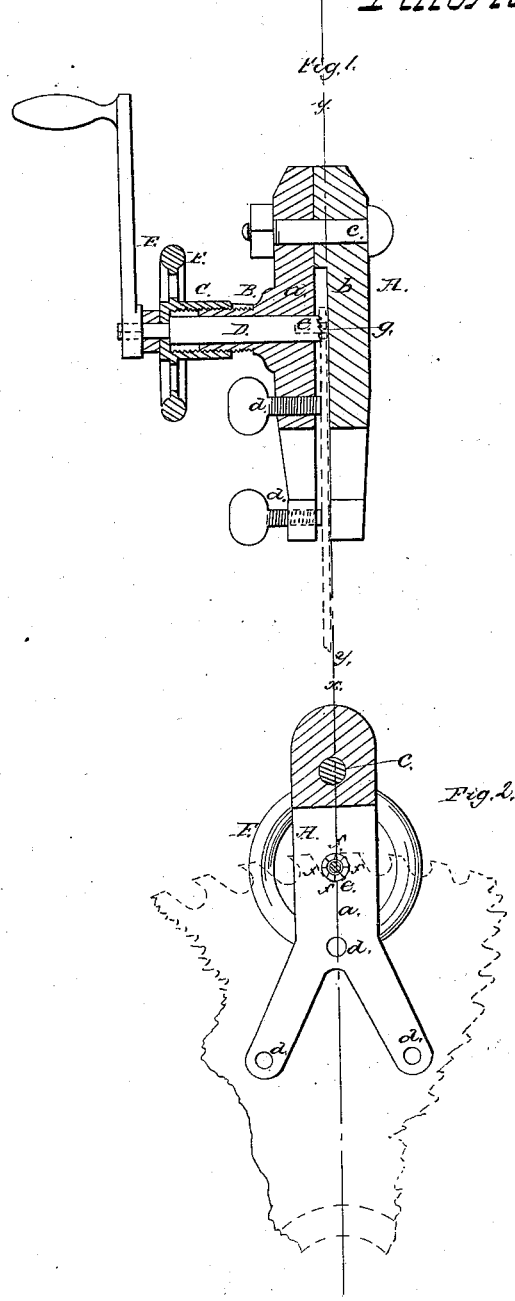

UNITED STATES PATENT OFFICE.

M. ERNSBERGER, OF BREMAN, OHIO.

SAW-GUMMER.

Specification of Letters Patent No. 19,835, dated April 6, 1858.

*To all whom it may concern:*

Be it known that I, M. ERNSBERGER, of Breman, in the county of Fairfield and State of Ohio, have invented a new and Improved Implement or Device for Gumming Saws; and I do hereby declare that the following is a full, clear, and exact description of the same, reference being had to the annexed drawings, making a part of this specification, in which—

Figure 1 is a longitudinal section of my improvement taken in the line $(x)$, $(x)$, Fig. 2. Fig. 2, is also a vertical section of do. taken in the line $(y)$, $(y)$, Fig. 1.

Similar letters of reference indicate corresponding parts in the two figures.

This invention consists in the employment or use of a stock provided with set screws for clamping it to the saw, in connection with a bur cutter peculiarly constructed and applied to the stock in such a way that the same may be properly guided or held in proper position while in operation and also fed to its work with the greatest facility the whole forming a simple and efficient implement, well adapted and more especially designed for gumming circular saws.

To enable those skilled in the art to make and use my invention I will proceed to describe its construction and operation.

A, represents the stock, which may be constructed of two metal bars $(a)$, $(b)$, divaricated at one end and connected together at the opposite end by a bolt $(c)$. The bar $(a)$ has three screws $(d)$ passing through it, one through each prong of its divaricated end and the other at or near the angle of the prongs. See Fig. 2.

From the outer side of the bar $(a)$ a tube B, projects at right angles, the external surface of this tube is provided with a screw thread and a collar C, is fitted on the tube, said collar being provided with an internal screw thread. D is a shaft or arbor, the outer end of which is secured within the collar C, and passes through the end of the collar and has a square made on it to receive a crank E. The shaft or arbor is allowed to turn freely within the collar C, and it is sufficiently long to pass entirely through the tube B, and bar $(a)$.

The inner end of the shaft or arbor D, has a cutter or bur $(e)$ formed on it. This cutter is made by forming ratchet shaped projections on the end of the shaft so that radial cutting edges $(f)$ are produced, see Fig. 2.

To the inner side of the bar $(b)$ a pin $(g)$ is attached. This pin is in line with the center of the shaft or arbor D, and the shaft or arbor has a longitudinal central opening or hole made in it to receive the pin $(g)$ which serves the double function of a guide to the shaft D, and guide for the adjustment of the cutter to the teeth as hereinafter described.

To the outer end of the collar C, a hand wheel F, is attached.

The operation is as follows: The stock A, is placed on the saw, the saw fitting in a space $(h)$ allowed between the bars $(a)$, $(b)$, the stock being secured to the saw by the screws $(d)$ and in such position that the pin $(g)$ will fit at the bottom of a space between two teeth $(i)$ of the saw, the stock being in a vertical position, see Fig. 2, in which the saw, a circular one, is shown in red. When the stock A, is thus adjusted to the saw, the collar C, is turned by hand in the proper direction to press the cutter $(e)$ firmly against the saw, and the shaft or arbor D, is then turned by hand so that the cutter $(e)$ will cut out a portion of the space between the two teeth, when the pin $(g)$ is placed the portion cut out being of course equal to the difference between the diameter of the pin $(g)$ and that of the cutter $(e)$. When a portion is cut out between the teeth and the space between them depressed, the screws $(d)$ are relaxed and the saw slightly turned so that the pin $(g)$, will fit in the adjoining space, the operation being repeated until the saw is gummed all around, the cutter $(e)$ being fed toward its work as occasion requires.

It will be seen that the pin $(g)$ serves as a guide for the adjustment of the implement to the saw, for said pin is always fitted at the bottom of the space to be depressed or cut out and the pin also guides the shaft or arbor D, insuring the perfect operation of the cutter.

This implement is exceedingly simple and efficient. It may be constructed at a trifling cost and readily kept in working order, and applied to circular saws without removing them from their shafts or arbors.

I do not claim separately the bur or cutter $(e)$ for that has been previously used for analogous purposes; but

Having thus described my invention, what I claim as new and desire to secure by Letters Patent, is—

The stock A, provided with the screws (d) or their equivalents and also provided with the tube B, collar C, pin (g) and the shaft D, with cutter (e) formed on it, the whole being combined and arranged substantially as and for the purpose set forth.

M. ERNSBERGER.

Witnesses:
 SAM BRISBIN,
 E. S. GARDNER.